(12) United States Patent    (10) Patent No.: US 7,565,400 B2
Wangoo et al.    (45) Date of Patent: Jul. 21, 2009

(54) METHOD AND SYSTEM FOR PRESERVING USER IDENTIFICATION WHEN GENERATING IMAGE DATA FROM A REMOTE LOCATION

(75) Inventors: Sanjay Wangoo, Lake Forest, CA (US); Manoj Verma, Lake Forest, CA (US); George Koppich, Palos Verdes Estates, CA (US)

(73) Assignee: Toshiba Tec Kabushiki Kaisha (JP)

( * ) Notice: Subject to any disclaimer, the term of this patent is extended or adjusted under 35 U.S.C. 154(b) by 439 days.

(21) Appl. No.: 10/271,385

(22) Filed: Oct. 15, 2002

(65) Prior Publication Data

US 2004/0073606 A1   Apr. 15, 2004

(51) Int. Cl.
   *G06F 15/16* (2006.01)
(52) U.S. Cl. .................... 709/203; 709/206; 709/213; 709/216
(58) Field of Classification Search ............... 709/203, 709/206, 213, 216, 200
See application file for complete search history.

(56) References Cited

U.S. PATENT DOCUMENTS

| | | | | |
|---|---|---|---|---|
| 5,999,968 | A * | 12/1999 | Tsuda | 709/213 |
| 6,704,118 | B1 * | 3/2004 | Hull et al. | 358/1.15 |
| 6,873,430 | B2 * | 3/2005 | Grasso et al. | 358/1.16 |
| 6,898,625 | B2 * | 5/2005 | Henry et al. | 709/206 |
| 2003/0081234 | A1 * | 5/2003 | Wiley | 358/1.13 |
| 2005/0022114 | A1 * | 1/2005 | Shanahan et al. | 715/513 |

* cited by examiner

*Primary Examiner*—John Follansbee
*Assistant Examiner*—Glenford Madamba
(74) *Attorney, Agent, or Firm*—Tucker Ellis & West LLP

(57) ABSTRACT

A method for a user using a thick client to send a print job to a server wherein the user name is preserved and can be determined by the server. When the image file is processed, the processing comprising appending a user identification to the file. A destination driver is invoked, which creates raw print data from the image file for each selected driver. The raw print data is sent to the server, wherein the server parses the raw data and determines the user identification. The raw print data can then be sent to the user's inbox on the server. In a preferred embodiment, the user identification comprises the sequence of ASCII 60 (or 3C hex), the username, and ASCII 62 (or 3E hex), or "<username>". Preferably, the user identification is appended to the document name.

18 Claims, 5 Drawing Sheets

METHOD AND SYSTEM FOR PRESERVING USER IDENTIFICATION WHEN GENERATING IMAGE DATA FROM A REMOTE LOCATION

CROSS-REFERENCE TO RELATED APPLICATIONS

This application is related to U.S. application Ser. No. 10/098,775 filed Mar. 14, 2002 and U.S. application Ser. No. 10/112,104 filed Mar. 29, 2002.

BACKGROUND OF THE INVENTION

The present invention is related to document management systems for multifunction peripherals in general and more particularly to a method for printing from a thick client to a document management module.

A Document Distribution Module (DMM) provides users the ability to send documents to multiple destinations, including but not limited to faxes, e-mail, iSP DMM, Web Post, and print. Typically, the distribution is accomplished by two types of clients, a thick client (similar to a print driver) on Microsoft Windows platforms, and a thin client, browser based client, which may be based on any platform. This distribution normally a network-based document service appliance for image Service Platform appliance (or iSP) that is a document distribution solution with document management capabilities and device management support. The document management component enables users to quickly store and retrieve documents from a central repository. Device management is used to discover devices, monitor device availability and provide device status to the user and Administrator.

A problem with this type of architecture is that the user's identity is often lost when performing print jobs from the thick client. This is because while application is logged in the context as user, the print processor in creating the raw print data is logged in the context as the special Windows user "SYSTEM." Because the print processor is loaded by Windows in the context of SYSTEM, the DMM or native driver used to send output from the client machine to the server machine, normally via a remote procedural call ("RPC call") connects to the server as the user SYSTEM. Therefore, when the iSP server receives the job from the remote, (client) spooler, the actual user name is lost and the iSP server is unable to place documents in the user's inbox. Therefore, a need exists for a method for preserving user identification when sending print data from a remote (client) computer to an iSP server.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a method for a user using a thick client to send a print job to a server wherein the user name is preserved and can be determined by the server. The method comprises invoking an application that runs in the user's context and initiating the print job. After initiating the print job, a distribution driver is loaded and displays a user interface comprising one or more drivers pointing to at least one queue on the server. The user selects at least one driver from the display. The method further comprises creating an image file for each driver selected. The image file is processed, the processing comprising appending a user identification to the file. A destination driver is invoked, which creates raw print data from the image file for each selected driver. The raw print data is sent to the server, wherein the server parses the raw data and determines the user identification. The raw print data can then be sent to the user's inbox on the server. In a preferred embodiment, the user identification comprises the sequence of ASCII 60 (or 3C hex), the username, and ASCII 62 (or 3E hex). Preferably, the user identification is appended to the document name.

It is contemplated that the present invention would be used on a system for sending a print job from a thick client to a server, comprising an application program, a distribution driver user interface, a graphical device interface, a print processor, a native driver; and a server communicatively coupled to the native driver. The graphical device interface is communicatively coupled to the application program, the distribution driver interface, the print processor, and the native driver. The print processor appends user identification to the image file and forwards the image file to the native driver, the native driver creating raw print data and sending the raw print data to the server. The server parses the raw print data and determines the user identification, puts the user identification into control data, and stores the raw print data and control data in a repository, the repository having a section dedicated to the user.

Preferably, a remote procedure call is used to communicate between the native driver and the server. Typically, in response to a print request from the application program, the print request initiated by a user, the graphical device interface accesses the distribution driver user interface, when the distribution device user interface is completed processing, the graphical device interface creates an image file, the image file is forwarded to the print processor. The system may further comprise a spooler, wherein the print processor is a component of the spooler.

In the preferred embodiment, the application program, graphical device interface, and distribution are in context of the user of the application program, the print processor, native driver, and server are in the context of System, the special Windows user.

In a preferred embodiment, the method identifies a user by saving the user name along with other User Interface Data collected by a distribution driver. The user interface data is subsequently passed to the print processor which invokes the native print driver by routing the respective EMF files created by the graphical data interface. The print processor appends the user name to the filename by encapsulating it within the tokens "<" and ">" or ASCII 60 (3C hex) and ASCII 62 (3E hex).

As those skilled in the art can readily appreciate, the present invention may be realized by using either hardware, software, or a combination thereof.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

In the drawings.

DETAILED DESCRIPTION OF INVENTION

Throughout this description, the preferred embodiment and examples shown should be considered as exemplars, rather than limitations, of the present invention.

The present invention is directed to a system that includes a document management system that provides access to the document management repository via a folder incorporated into the existing operating system file structure When utilizing a Microsoft Windows® operating system, the system provides access to network-based documents via Windows Explorer®. Although this feature represents a only a subset of the operations available to a user who uses the present invention, the browser-based client provides ease-of-use to a user who is accustomed to using the Windows tools and environment, and provides sufficient functionality for the user who simply needs to perform basic functions.

When a user invokes the Windows Explorer file manager, a document repository is represented as another folder within the Explorer folder pane. A user can perform the following operations on the repository folder insofar as the user has the appropriate access rights: expand the folder tree structure, view folder properties, delete a folder, rename the folder, copy the folder, move the folder, drag-and-drop a document, delete the document, rename the document, copy the document, move the document, view document properties, and view the document content as read-only. When the document is moved or copied within the repository file structure, the document, as well as its meta data, are "moved" or "copied". When the document is moved or copied to a folder that is located outside the repository, only the document content is moved or copied (this operation is equivalent to a download operation).

Figure 1:
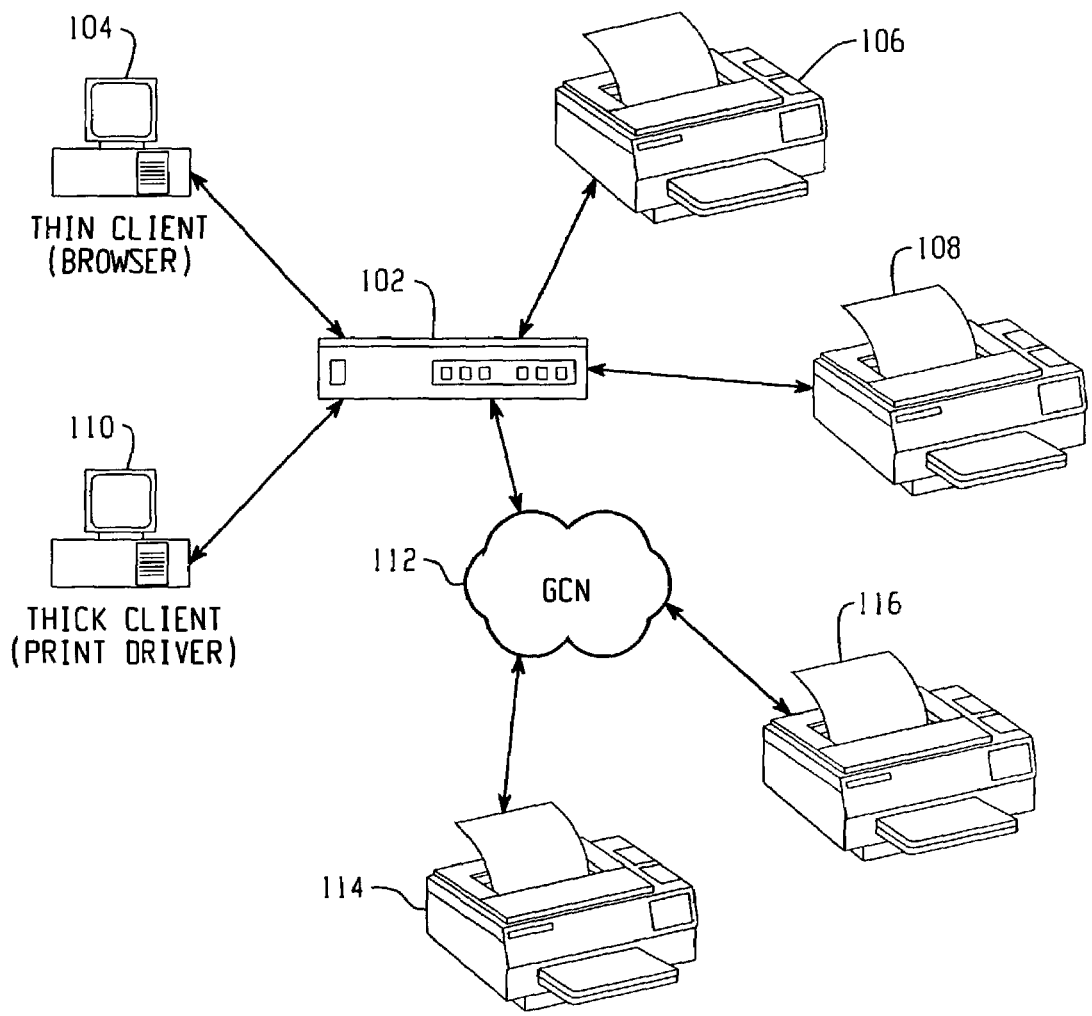
FIG. 1 illustrates a block diagram of a conceptual overview of a system incorporating the present invention.

Referring now to FIG. 1, there is illustrated a block diagram of a conceptual overview of a system 100 incorporating a document management architecture. The system 100 includes a network-based document service appliance 102 (hereinafter also denoted as iSP appliance for image Service Platform appliance) that is a document distribution solution with document management capabilities and device management support. The document management component enables users to quickly store and retrieve documents from a central repository. Device management is used to discover devices, monitor device availability and provide device status to a user.

The appliance 102 replaces or supplements existing fax, print and e-mail servers, and offers a more efficient method of transmitting, tracking and storing business-to-business documents. The appliance 102 is a client/server system suitably implemented in single and collaborative corporate workgroups (although not limited to such environments) designed to increase productivity and reduce costs by making document communications simple to perform and more reliable. Users can share documents and conduct collaborative work between various workgroups. For example, collaboration between sales and accounting can occur when issuing customer quotes, generating offers or approving a credit line, tracking job costs, and charging back users.

A typical application consists of transmitting critical documents that impact the operations of a business. These critical documents can be from, but are not limited to, the following functional areas of a business: Sales, Accounting, Purchasing, Engineering, Warehouse, and Human Resources. All of these documents are representative of a critical business process. A job routing component allows a user to direct jobs to one or more Multifunction Peripheral devices (MFPs) and other LPD-compliant devices, to faxes, e-mail and web servers. An LPD-compliant device is a Network Print Server (i.e., Line Printer Daemon (or spool area handler)) that allows access to printers from a local computer across a TCP/IP network, e.g., the Internet.

Like many conventional appliances, the iSP appliance 102 is a plug-n-play device having a hardware component consisting of a closed-box server that is easy to install, configure and support, and the software component is the iSP software, both of which will be described in greater detail hereinbelow. The appliance 102 provides routing services, document management services, and device management services on behalf of one or more iSP clients. For example, in a local area network (LAN) environment, the appliance 102 provides services from a first "thin" browser-based client 104 to one or more local network peripherals (106 and 108) disposed on the LAN. The disclosed appliance architecture is suitably accommodating for a "thick" driver-based client 110 also disposed on the LAN, such that the thick client 110 can access the services provided by the appliance 102 in the LAN environment.

The system 100 is suitably operable to provide services to the thin client 104 and the thick client 110 over a packet-switched TCP/IP-based global communication network (GCN) 112 to one or more remote peripherals (114 and 116) disposed thereon. Such remote devices (114 and 116) comprise the same types of network peripheral devices (106 and 108) disposed on the LAN, e.g., printers, faxes, copiers, multifunction peripherals, scanners, etc.

Figure 2:
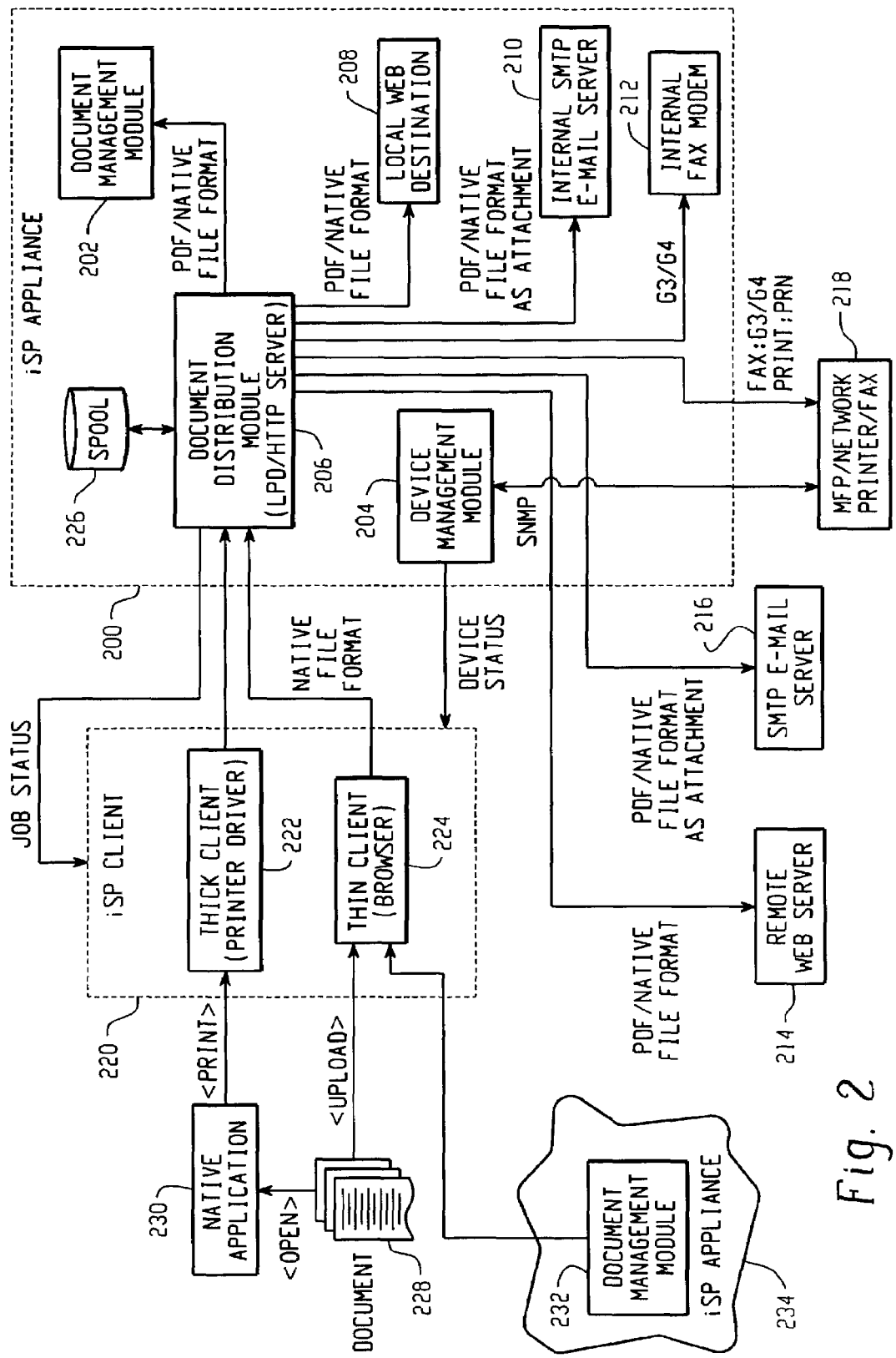
FIG. 2 illustrates a block diagram of a client/server topology, in accordance with an embodiment of the present invention

Referring now to FIG. 2, there is illustrated a block diagram of a client/server topology, in accordance with a disclosed embodiment. From an architectural standpoint, an appliance 200 (similar to appliance 102) is a client/server system comprising a document distribution solution with document management capabilities and device management support. In support of such capabilities, the appliance 200 comprises the following three modules: a Document Management Module (DMM) 202; a Device Management Module (DVMM) 204; and a Document Distribution Module (DDM) 206. Note that the architecture is not limited to these three modules, but is suitably extensible to include other modules that facilitate document and device management. The main function of the DMM module 202 is to store documents in a central document repository and to facilitate user capability to modify documents, collaborate during document editing, and search and locate stored documents. The main function of the DDM module 206 is to route jobs to destinations such as printers, faxes, e-mail servers, the DMM repository, and web servers. The main function of the DVMM module 204 is to provide a centralized facility for discovering, examining, and controlling networked output devices.

The DDM 206 interfaces to the DMM 202 to distribute documents to the DMM 202 in native file formats, and PDF (Portable Document Format). The DDM 206 interfaces to both internal and external servers to distribute files thereto. For example, the DDM 206 distributes files to one or more local web servers 208 in both PDF and native file formats; one or more internal SMTP e-mail servers 210 in PDF and native file formats, as attachments; and one or more internal fax modems 212 in G3/G4 fax file formats. Where such devices are remote from the appliance 200, the DDM 206 interfaces to one or more of the following devices for the transmission of files thereto: a remote web server 214 in PDF and native file formats; a remote SMTP (Simple Mail Transfer Protocol) e-mail server in PDF and native file formats, as attachments; and a remote MFP/network printer/fax modem 218 in G3/G4 fax file formats.

A client block 220 represents both a thick client type 222 (similar to thick client 110) and a thin client type 224 (similar to thin client 104) with general interfaces to the appliance block 200. The DVMM 204 of the appliance 200 reports device status signals to the client block 220, indicating that such status signals are transmitted to the thick client types 222 and the thin client types 224. Both the thick client 222 and the thin client 224 interface to the DDM 206 for document distribution to selected internal and external devices. The DDM 206 also reports back to the client block 220 the job status of the documents forwarded to the DDM 206 for distribution. Documents received into the DDM 206 are spooled to a spool device 226 internal to the appliance 200.

Documents 228 input to the thick client 222 are opened within a native application 230, and sent to the thick client 222 in response to a print command of the native application 230. Since the thin client 224 is browser-based for selecting documents from a server, the documents 228 are uploaded to the thin client 228. Additionally, the thin client 224 suitably communicates with a remote DMM 232 of a second appliance 234.

The DDM 206 has a client-server architecture, where the appliance 200 is the server component and all the user machines (thin and thick types) are the clients. The primary function of the DDM 206 is to route jobs to various types of destinations from virtually any type of client operating system (OS) (e.g., Windows, Unix, Mac, etc.) without requiring a user to have special skills in managing output devices. As described hereinabove, there are two types of clients available: the thick client 222 (i.e., operating through a printer driver), and the thin client 224 (i.e., operating through a browser). (Note that the thick client 222 is only available on supported Windows platforms.) In the embodiment of FIG. 2, the appliance 200 runs a Linux OS. The DDM 206, in turn, routes the job to its final destination (either internal or external). Thus the appliance 200 becomes the focal point for monitoring and controlling delivery of these jobs to the respective destinations. The clients (222 and 224) offer the capability of saving a particular set of routing options as a profile, and by doing so, simplifies user tasks when submitting jobs with the same options, and to the same destination. The destination types include a network printer (of MFP 218), e-mail servers (210 and 214), web servers (208 and 214), and fax modem (212, and of MFP 218).

The thin client 224 can send documents to all destinations that can be reached via the thick client 222 with one important distinction-no format conversions are applied to these documents. These documents are delivered to the final destination in the original (i.e., "native") format.

The browser interface featured by the thin client 224 provides a user the capability to browse for the document that needs to be distributed to one or more destination devices, select one or more destination types, select one or more specific destinations, and select the properties of the specific destination. When selecting the destination-types, and in the case of a printer or fax destination, the document 228 should be in the specific format supported by the respective printer or fax, as the document will be routed as is. The thin client 224 supports the following destination types: network printer, e-mail, web server post, fax modem, and DMM. The specific destinations can then be selected, and the corresponding properties of the specific destination, for example, e-mail properties, web-post properties, fax modem properties, network printer properties, and DMM properties.

Under the E-mail properties (when this destination type is configured the iSP Admin has to provide the hostname of the respective SMTP server), the following options are provided: "To" E-mail address, "CC/BCC" E-mail address, "Subject", "Message", "From User" will be the Windows login username, and Address book with MAPI support.

Under The Web-post properties (a web-service needs to be installed on the posting web server), the Document Title and Comment may be viewed. With the Fax Modem properties, the user can select one or more available fax devices and the corresponding vendor specific properties. The Network Printer properties allows the user to select one or more available print devices, however, no vendor-specific properties are selectable. The user can also check the status of the appliance queue associated with the selected device. The DMM properties (the document is routed to a user inbox) allow the Document Title and Comments to be viewed.

The client installation is performed according to the type of client and user platform. For Windows platforms, the thick client 222 is installed via a point-and-print capability. The thick client 222 can also be installed by pointing the browser to the URL (Uniform Resource Locator) path of the appliance 200. The thin client 224 does not require any special installation, as this functionality is made available by pointing the browser to the URL of the appliance 200. For Unix platforms, the thin client 224 does not require any special installation, as this functionality is made available by pointing the browser to the URL of the appliance 200.

The number and nature of the screens presented to a user by the thick client 222 depends on the type and number of selected destinations. To route a document via the thick client 222, a user opens a document 228 in its native application 230, and selects the File/Print menu. To use the thick client 222 for routing, the native application 230 must support the print functionality of the Windows OS. As a next step, the user needs to select a destination. If the user intends to send the job to only one destination, then the subsequent sequence of steps is similar to any other Windows print operation. However, if the user intends to send the job to multiple destinations, then the user selects the following options: Print Driver, in the Printer dialog box (some applications may have a different way of selecting the destination printer), destination-type(s), specific destination(s), properties of the specific destination, or alternatively, to avoid navigating the property screens, select and load a previously-stored job delivery profile. The user can also store the current job profile.

When the user is in the Print Driver option and further selects the Properties button, a common, generic set of properties (these properties may be overridden by the application's page setup values) can be applied to the routed document, for example, Page Size, Orientation, Color/B&W, and number of Copies.

When in the user is in the destination-types option, the user can select Network Printer, E-Mail, Web post, Fax modem, and DMM. The specific destination can then be selected, and the corresponding properties of the specific destination, for example, E-mail properties, Web-post properties, Fax modem properties, Network printer properties, and DMM properties.

Under the E-mail properties (when this destination type is configured the iSP Admin has to provide the host name of the respective SMTP server), the following options are provided: "To" E-mail address, "CC/BCC" E-mail address, "Subject", "Message", "From User" will be the Windows login username, and Address book with MAPI support. Under the Web-post properties (an iSP web-service needs to be installed on the posting web server), the Document Title and Comment may be viewed. With the Fax Modem properties, the user can select one or more available fax devices and the corresponding vendor specific properties. The Network Printer properties allow the user to select one or more available print devices and the corresponding vendor specific properties. The user can also check the status of the appliance queue associated with the selected device. The DMM properties (the document is routed to a user inbox) allow the Document Title and Comments to be viewed. Alternatively, to avoid navigating the property screens, the user has the option to select and load a previously stored job delivery profile. The user can also store the current job profile.

Under the E-mail properties (when this destination type is configured the iSP Admin has to provide the host name of the respective SMTP server), the following options are provided: "To" E-mail address, "CC/BCC" E-mail address, "Subject", "Message", "From User" will be the Windows login username, and Address book with MAPI support. Under the Web-post properties (an iSP web-service needs to be installed on the posting web server), the Document Title and Comment may be viewed. With the Fax Modem properties, the user can select one or more available fax devices and the corresponding vendor specific properties. The Network Printer properties allow the user to select one or more available print devices and the corresponding vendor specific properties. The user can also check the status of the appliance queue associated with the selected device. The DMM properties (the document is routed to a user inbox) allow the Document Title and Comments to be viewed. Alternatively, to avoid navigating the property screens, the user has the option to select and load a previously stored job delivery profile. The user can also store the current job profile.

Figure 3A:
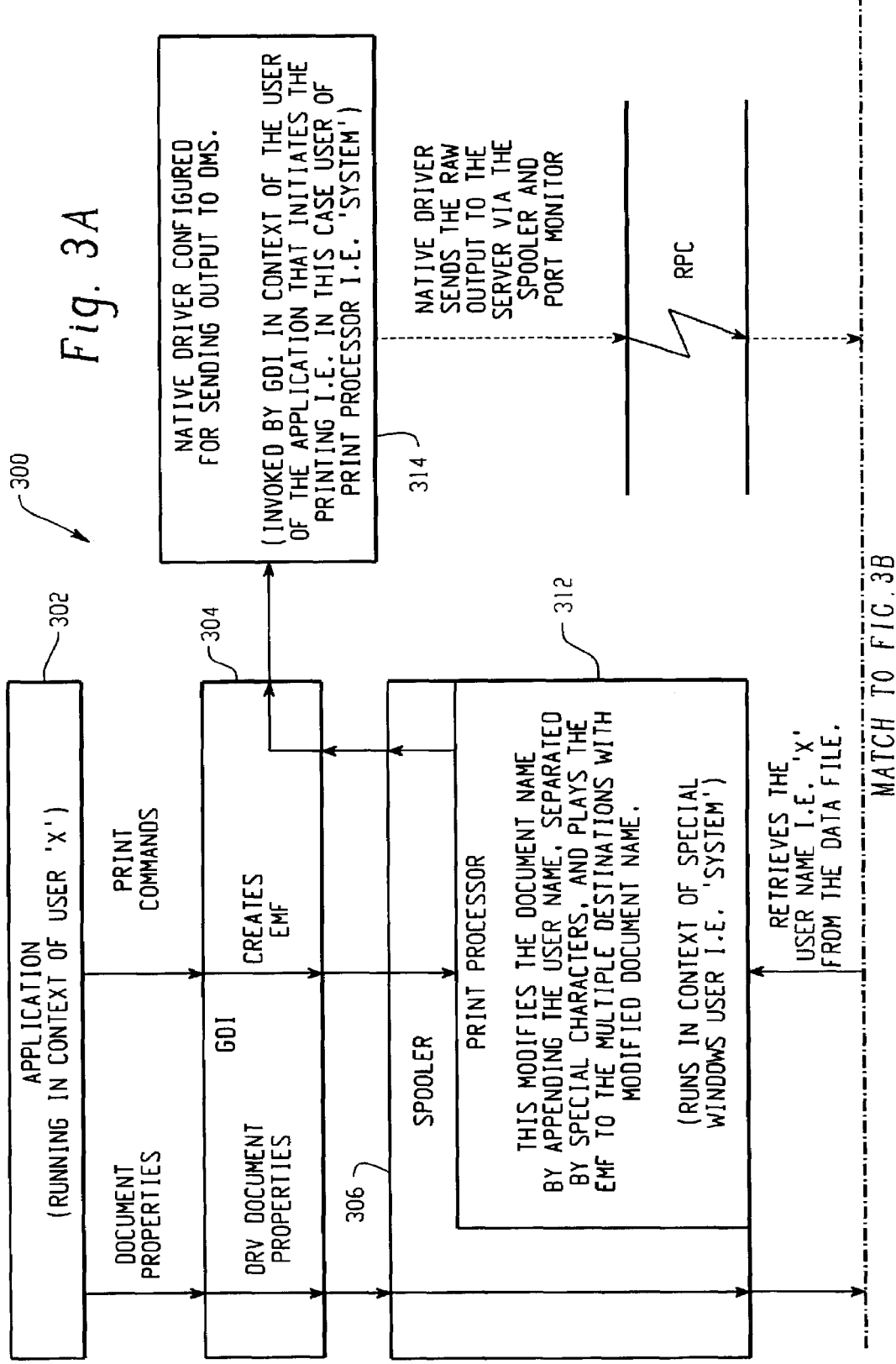
FIG. 3 is a block diagram of a system suitably adapted for use by the present invention.
Figure 3B:
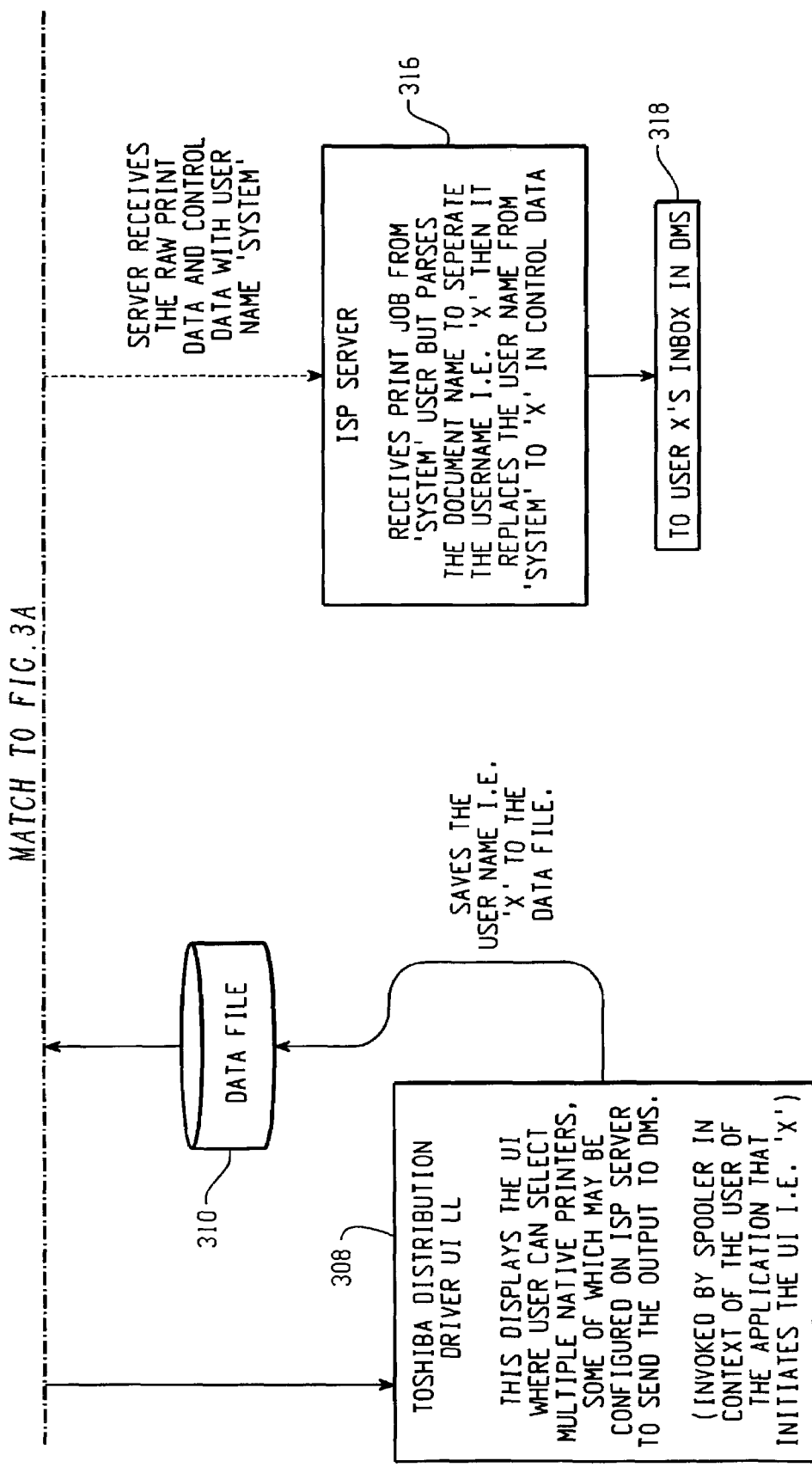

Referring now to FIG. 3 there is shown a client/server system 300 contemplated by the preferred embodiment of the present invention. An application 302 is running under the context user on the client machine. The application 304 communicates with the graphical data interface (GDI) 304. The application 302 sends document properties or print commands to the GDI 304.

A spooler 306 with a print processor 312 is communicatively coupled to the GDI 304. A distribution driver 308 is invoked when the application 302 initiates a print request. As shown in FIG. 3, the distribution driver 308 is invoked via the spooler 306. The distribution driver is invoked in the context of the user and displays a user interface wherein the user can select one or more destinations (not shown), such as native printers, some of which may be configured on a server 316, preferably the server is an image Service Platform appliance (or iSP).

After printers have been selected, a data file 310 is created. The GDI 304 creates an Enhanced Meta Files (EMF). The EMF is then sent to the spooler 306 and is processed by the print processor 312. The print processor 312, which runs in the context of the special Windows user SYSTEM reads and interprets the EMF and reads the user selections from the data file 310. The print processor 312 then appends the user identification to the file name. Preferably, the user name is encapsulated by special characters, such as "<" and ">" or ASCII 60 (3C hex) and ASCII 62 (3E hex). For each destination selected by the user, the print processor 312 translates EMF commands to commands that the native driver 314 understands, and then routes the processed file to the native driver 314.

A native driver 314 receives the print data and control data from the print processor 312 via the spooler 306 and the GDI 304. The native driver 314 is configured for sending output to a document management system and is invoked by the GDI 304 in the context of the user of the application 302 that initiated the print job, which for thick clients in the case of normal Windows platforms is the user of the print processor, SYSTEM. The native driver 314 creates raw print data and then initiates a remote procedure call to the server 316. The native driver 314 then sends the raw print data and the control data to the server via the spooler 306 and the port monitor (not shown). The server 316 receives the print job from the native driver, the print job context being from the SYSTEM user. However, the server 316 parses the raw print data and separates the user name from the document data and changes the user from SYSTEM to the correct user name. Once the correct user name has been determined, the server 316 forwards the raw print data and control data to the user's inbox 318 in the document management system.

Figure 4:
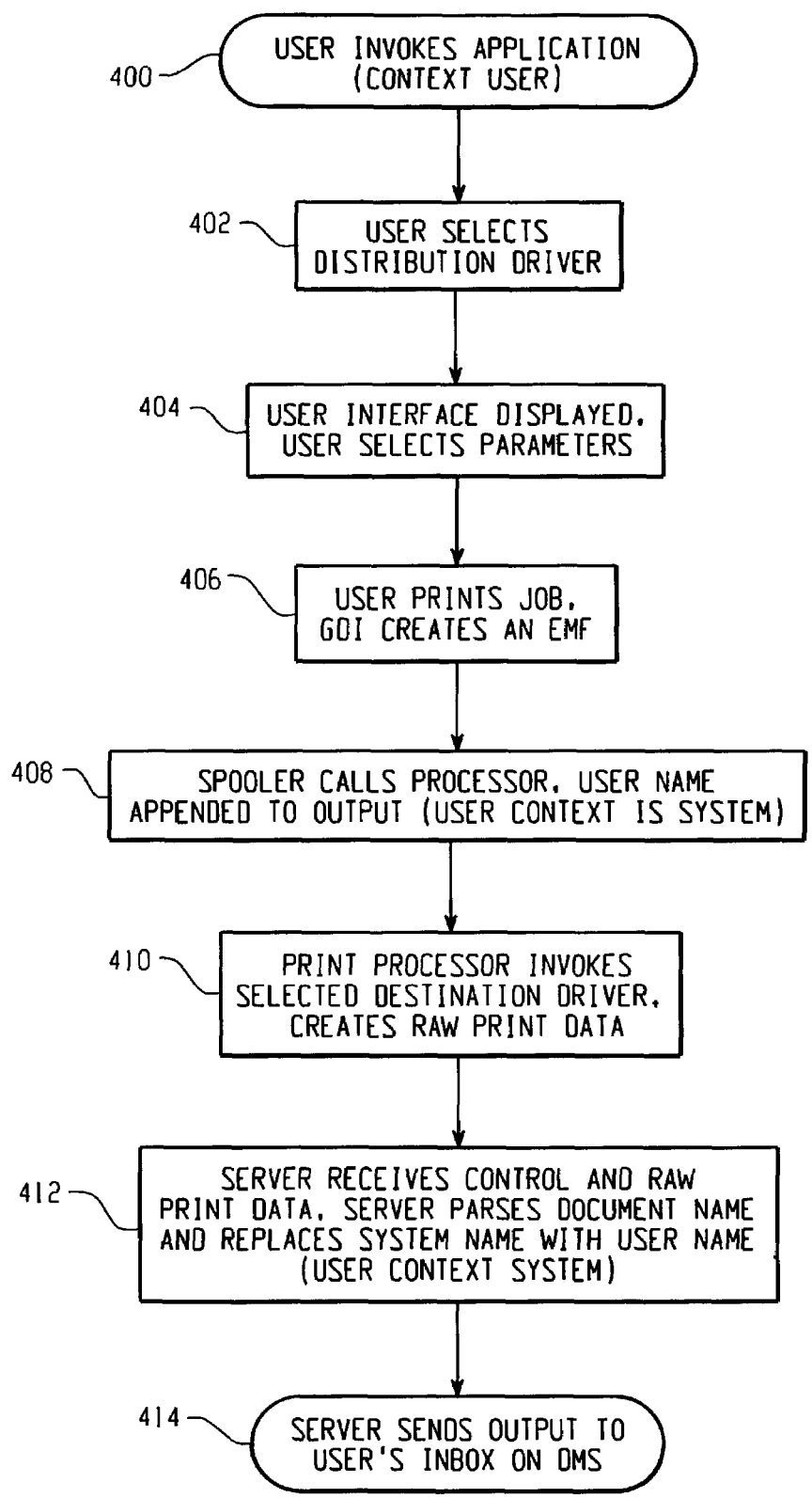
FIG. 4 is a block diagram describing a method of the present invention.

Referring now to FIG. 4 there is illustrated a method contemplated by the present invention. The method starts at step 400 when the user invokes an application 302 running in the user's context and requests a print job. The user then receives a print dialog and selects the distribution driver 308, which for this example is the Toshiba Distribution Driver as shown in step 402. Selecting the distribution driver 308 in step 402 causes the application to call the document/properties application programming interface, and as shown in step 402 the distribution driver displays a user interface (not shown). The user then selects one or more native drivers 314 that point to print queues on the server 316. The print queues may be configured to send the output to the document management system. The user interface saves the selected destinations and their properties in a data file 310 and also saves the user's user name to the document file (not shown).

At step 406 the user prints the job. The application 302 calls the GDI's 304 application programming interface to print to the distribution device's 308 device context. The GDI creates an EMF (not shown) and passes it on to the spooler 306.

At step 408 the spooler 306 receives the EMF and calls the print processor 312 which is running in the context of the special Windows user SYSTEM. The print processor 312 reads and processes the EMF. Furthermore, the print processor 312 appends the user name to the document name, as this is the only control data field which can be modified by the print processor to include the user name.

At step 410 the print processor 312 invokes the selected destination's native driver 314. When the native destination driver 314 is invoked by the print processor 410, it is under the print processor's context which is the special Windows user SYSTEM. The native driver 314 for the destination creates the raw print data and sends it to the server 316 via the spooler 306 and port monitor (not shown).

At step 412 the server 316 receives the control data and raw print data from the native driver, the context is user SYSTEM. The server 316 then parses the document name in the control data and separates the actual user name in the control data and changes the name from SYSTEM to the actual user name.

Once the user's actual name has been determined, the server 316 sends the output to the user's inbox 314 in the document management system as shown in step 414.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A system for remote storage of documents submitted via a device driver, comprising:
    hardware means adapted for receiving an electronic document into an output driver disposed on an associated workstation for storage on an associated document management system;
    means adapted for receiving data representative of at least one document storage device to be associated with the electronic document;
    means adapted for generating raw print stream data corresponding to the electronic document from the output driver;
    means adapted for embedding in the raw print stream data identification data corresponding to an identity of a source of the electronic document;
    means adapted for receiving a document storage request from the associated workstation;
    means adapted for communicating from the raw print stream data to a document storage device in connection with an anonymous source identifier;
    means adapted for parsing the raw print stream data to extract embedded identification data therefrom;
    means adapted for replacing the anonymous source identifier with extracted embedded identification data;
    means adapted for identifying a selected storage area from a plurality thereof within the document storage device, which storage area is uniquely associated to the user in accordance with the identification data;
    means adapted for routing status data to the associated workstation in accordance with identification data;
    means adapted for receiving a retrieval request, inclusive of the identification data, for retrieval of the electronic document from the document storage device; and
    means adapted for outputting the electronic document from the data storage area associated with the user document storage device in accordance with a received retrieval request.

2. The document rendering system of claim 1 wherein the identification data includes the sequence of ASCII 60, user name, and ASCII 62.

3. The document rendering system of claim 1 wherein the raw print stream data is comprised of a meta file.

4. The document rendering system of claim 3 wherein the raw print stream data is comprised of an enhanced meta file.

5. The document rendering system of claim 1 further comprising means adapted for receiving data representative of document rendering parameters for rendering the associated electronic document.

6. The document rendering system of claim 5 wherein means adapted for receiving the document rendering parameters includes means adapted for prompting an associated user for document rendering parameters and means adapted for receiving the document rendering parameters from the associated user.

7. A document rendering method comprising the steps of:
    receiving an electronic document into an output driver disposed on an associated workstation for storage on an associated document management system, wherein the receiving is executed by a hardware processor;
    receiving data representative of at least one document storage device to be associated with the electronic document;
    generating raw print stream data corresponding to the electronic document from an electronic document from the output driver;
    receiving a document routing request from the associated workstation;
    embedding in the raw print stream data identification data corresponding to an identity of a source of the electronic document:
    communicating from the raw print stream data to a document storage device in connection with an anonymous source identifier;
    parsing the raw print stream data to extract embedded identification data therefrom;
    replacing the anonymous source identifier with extracted embedded identification data;
    identifying a selected storage area from a plurality thereof within the document storage device, which storage area is uniquely associated to the user in accordance with the identification data;
    routing status data to the associated workstation in accordance with identification data;
    receiving a retrieval request, inclusive of the identification data, for retrieval of the electronic document from the document storage device; and
    outputting the electronic document from the data storage associated with the user document storage device in accordance with a received retrieval request.

8. The document rendering method of claim 7 wherein the identification data includes the sequence of ASCII 60, user name, and ASCII 62.

9. The document rendering method of claim 7 wherein the raw print stream data is comprised of a meta file.

10. The document rendering method of claim 9 wherein the raw print stream data is comprised of an enhanced meta file.

11. The document rendering method of claim 7 further the step of receiving data representative of document rendering parameters for rendering the associated electronic document.

12. The document rendering method of claim 11 wherein the step of receiving the document rendering parameters includes the steps of prompting an associated user for document rendering parameters and receiving the document rendering parameters from the associated user.

13. A computer-implemented method for rendering documents comprising the steps of:
    receiving an electronic document into an output driver disposed on an associated workstation for storage on an associated document management system, wherein the receiving is executed by a hardware processor;
    receiving data representative of at least one document storage device to be associated with the electronic document;
    generating raw print stream data corresponding to the electronic document from an electronic document from the output driver;
    receiving a document routing request from the associated workstation;

embedding in the raw print stream data identification data corresponding to an identity of a source of the electronic document;

communicating from the raw print stream data to a document storage device in connection with an anonymous source identifier;

parsing the raw print stream data to extract embedded identification data therefrom;

replacing the anonymous source identifier with extracted embedded identification data;

identifying a selected storage area from a plurality thereof within the document storage device, which storage area is uniquely associated to the user in accordance with the identification data;

routing status data to the associated workstation in accordance with identification data;

receiving a retrieval request, inclusive of the identification data, for retrieval of the electronic document from the document storage device; and outputting the electronic document from the data storage associated with the user document storage device in accordance with a received retrieval request.

14. The computer-implemented method for rendering documents of claim 13 wherein the identification data includes the sequence of ASCII 60, user name, and ASCII 62.

15. The computer-implemented method for rendering documents of claim 13 wherein the raw print stream data is comprised a meta file.

16. The computer-implemented method for rendering documents of claim 15 wherein the raw print stream data is comprised of an enhanced meta file.

17. The computer-implemented method for rendering documents of claim 13 further the step of receiving data representative of document rendering parameters for rendering the associated electronic document.

18. The computer-implemented method for rendering documents of claim 17 wherein the step of receiving the document rendering parameters includes the steps of prompting an associated user for document rendering parameters and receiving the document rendering parameters from the associated user.

* * * * *